United States Patent
Hulbert

(10) Patent No.: US 7,848,730 B2
(45) Date of Patent: Dec. 7, 2010

(54) METHOD OF CONTROLLING INTERFERENCE FROM A TRANSMITTER IN ONE COMMUNICATION SYSTEM TO A RECEIVER IN ANOTHER COMMUNICATION SYSTEM

(75) Inventor: Anthony Peter Hulbert, Bassett Green (GB)

(73) Assignee: Roke Manor Research Limited, Romsey (GB)

(*) Notice: Subject to any disclaimer, the term of this patent is extended or adjusted under 35 U.S.C. 154(b) by 1001 days.

(21) Appl. No.: 10/573,811

(22) PCT Filed: Oct. 5, 2004

(86) PCT No.: PCT/GB2004/004222

§ 371 (c)(1),
(2), (4) Date: Jan. 11, 2007

(87) PCT Pub. No.: WO2005/036909

PCT Pub. Date: Apr. 21, 2005

(65) Prior Publication Data

US 2007/0202901 A1    Aug. 30, 2007

(30) Foreign Application Priority Data

Oct. 7, 2003 (GB) .................. 0323429.1
Mar. 19, 2004 (GB) .................. 0406219.6

(51) Int. Cl.
*H04M 9/00* (2006.01)
(52) U.S. Cl. .................. 455/402; 455/63.1; 455/426.1; 455/522

(58) Field of Classification Search ......... 455/63.1, 455/70, 402, 426.1, 501, 522
See application file for complete search history.

(56) References Cited

U.S. PATENT DOCUMENTS

| 4,567,485 A | 1/1986 | Oshima et al. |
| 5,412,658 A | 5/1995 | Arnold et al. |
| 5,491,837 A | 2/1996 | Haartsen et al. |
| 5,794,157 A * | 8/1998 | Haartsen ............... 455/522 |
| 6,377,608 B1 | 4/2002 | Zyren |
| 6,618,427 B1 | 9/2003 | Yasaki |
| 6,724,804 B1 * | 4/2004 | Kegasa et al. ........... 375/130 |
| 7,315,566 B2 * | 1/2008 | Tanno et al. ............ 375/142 |
| 2007/0004444 A1 * | 1/2007 | Klein et al. ............ 455/522 |

FOREIGN PATENT DOCUMENTS

EP         1 168 671 A2    1/2002

(Continued)

OTHER PUBLICATIONS

Great Britain Search Report dated Sep. 16, 2004 (One (1) page).

*Primary Examiner*—Tuan H Nguyen
(74) *Attorney, Agent, or Firm*—Crowell & Moring LLP

(57) ABSTRACT

A method of controlling interference from a transmitter (4) in one communication system to a receiver (1) in another communication system, the method comprising transmitting a beacon (3) beacon from a beacon transmitter associated with the receiver representative of a frequency at which the receiver is trying to receive; listening for the beacon at a beacon receiver associated with the transmitter; and deriving a power spectral density limit for a transmission (2) from the transmitter based upon the strength of the beacon received at the beacon receiver.

22 Claims, 1 Drawing Sheet

FOREIGN PATENT DOCUMENTS

Figure 1:
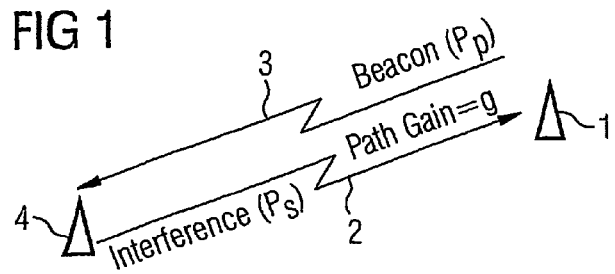

| | | |
|---|---|---|
| GB | 2 174 573 A | 11/1986 |
| JP | A-11-285062 | 10/1999 |
| JP | A-11-340947 | 12/1999 |
| JP | T-2000-517131 | 12/2000 |
| WO | WO 98/06186 A1 | 2/1998 |
| WO | WO 98 09461 | 3/1998 |
| WO | WO 02/063897 A1 | 8/2002 |

* cited by examiner

Frequencies
Represented

METHOD OF CONTROLLING INTERFERENCE FROM A TRANSMITTER IN ONE COMMUNICATION SYSTEM TO A RECEIVER IN ANOTHER COMMUNICATION SYSTEM

This invention relates to a method of controlling interference from a transmitter in one communication system to a receiver in another communication system. In general, a certain frequency band is allocated for a particular type of communication system, e.g. mobile phones and then within that frequency band, any equipment which wishes to communicate must share the allocated spectrum with other user equipment giving rise to the possibility of interference. In any system with at least one transmitter and one receiver, it is assumed that the transmitter is the cause of the interference. However, the fundamental problem of spectrum sharing is not the transmitters, but the receivers. This is because, with current systems, it is possible to sense the presence or absence of signal from a transmitter that is already operating on a frequency one wishes to share, but it is not possible to determine whether transmission on a particular frequency will cause interference at a receiver or not. The presence of a strong signal might indicate that a remote receiver will have no problem with any interference the transmitting terminal might generate. Equally a weak signal might indicate that a nearby receiver cannot cope with any interference the transmitting terminal might produce. This runs contrary to the standard philosophy of dynamic channel assignment in which the channels with minimum interference are preferred.

In accordance with a first aspect of the present invention, a method of controlling interference from a transmitter in one communication system to a receiver in another communication system comprises transmitting a beacon from a beacon transmitter associated with the receiver representative of a frequency at which the receiver is trying to receive; listening for the beacon at a beacon receiver associated with the transmitter; and deriving a power spectral density limit for a transmission from the transmitter based upon the strength of the beacon received at the beacon receiver.

The problem of whether or not a transmission will cause interference can only be addressed if it is known where the receivers are, so in the present invention, receivers transmit and transmitters receive to convey this information. If a beacon is received above a certain level, then an assessment is made of the extent to which the transmitter power needs to be reduced to have enough power to transmit, without interfering with the transmitter with which that beacon is associated. Thus, priority can be given to protecting an incumbent system from additional interference, without preventing transmission in the other communication system entirely.

Preferably, for a plurality of beacons received representing the same frequency, the derived maximum transmit power spectral density is related to that of the beacon received at the highest power.

It is assumed that if a transmission is set, such that it does not interfere with the receiver represented by the beacon at the highest power, then all the others will be unaffected too, whether because they are further away or otherwise more tolerant of interference.

Preferably, the method further comprises comparing the derived transmit power spectral density limit with a predetermined minimum transmit power spectral density required by the transmitter for that frequency; and transmitting a signal at that frequency, only if the determined transmit power spectral density limit exceeds the minimum.

If the transmission would not be of sufficient power to reach its intended destination, then it is not sent. This can be overcome by sending via an intermediate terminal, so that the required minimum level is lower.

Preferably, a predetermined maximum transmit power spectral density is set, if no beacons are received at the transmitter.

If the receiver in a sharing system, whose beacon is being received as the strongest beacon, is protected by the sharing transmitter setting its power accordingly, then this guarantees that any other receivers using that frequency experience even less interference.

Preferably, the method further comprises choosing a transmission frequency for the transmitter which permits the maximum power spectral density for the transmission.

Preferably, the transmission from the transmitter is transmitted at a frequency derived by determining the strongest received beacon which represents any one frequency; thereafter selecting, from the determined strongest beacons, the beacon with the lowest power; and transmitting at the frequency represented by that selected beacon.

Preferably, a transmit power spectral density for a transmission from the transmitter is set dependent upon the strength of the received beacon at the chosen frequency.

Preferably, the maximum permitted power spectral density of the transmitter is set at the product of the receiver beacon power; and a factor by which the receiver can be de-sensitised minus one; and the resultant of the receiver noise figure divided by the product of the effective bandwidth at the beacon receiver for receiving the beacon, the minimum signal to noise ratio for receiving the beacon in its effective bandwidth and the noise figure of the beacon receiver at the transmitter.

Preferably, a random time division multiple access (TDMA) protocol is applied, whereby beacons representing different frequencies transmit at different times, such that over a series of cycles a beacon representing each frequency will be heard at a different time relative to another particular represented frequency, such that no one frequency at a higher power consistently blocks reception of a beacon representing another frequency at a lower power.

Preferably, a code division multiple access (CDMA) protocol is applied, whereby beacons representing different frequencies are distinguished from one another by different codes.

Use of a CDMA protocol allows a large number of beacons to share the same frequency band whilst being in band to provide multipath diversity.

Preferably, a correlation period of a CDMA component of the beacon signal is controlled by a fast Fourier transform controller.

Preferably, each beacon transmits a type identifier and each beacon receiver comprises type specific correlation means, such that a beacon receiver can ignore same type beacons in determining whether or not or how much power to transmit.

Preferably, a receiver transmits a beacon only if interference levels exceed an acceptable value.

This saves power in the beacon transmitter, by avoiding unnecessary transmissions.

Preferably, the beacon power is adapted to the wanted signal power received at the receiver.

Adaptation of the beacon power allows more interference to be experienced at the beacon transmitting site where this will not disrupt communication.

Preferably, the beacon power is adapted to the interference power received at the receiver.

Adapting the beacon power allows the beacon transmit site equipment to adjust the allowable transmission from multiple sources, such that sum of all interference received is at an acceptable level.

Preferably, a bandwidth managed by a beacon is sufficiently narrow that substantial correlation of shadow fading applies across that bandwidth.

Preferably, beacon communication is separated from a spectrum that is managed by the beacons by using a different frequency.

Preferably, each beacon occupies a frequency bandwidth which is small compared with the total bandwidth managed by that beacon.

Preferably, neighbouring beacons in a managed bandwidth manage discrete contiguous sections of frequency; each section comprising a fraction of the beacon managed band, each beacon being separated from the frequency bandwidth which it manages by the alternate fraction.

This arrangement for bandwidth management allows efficient separation of the beacon band from the communications band to allow duplex filtering.

The fractions can be unequal, such as ⅓ and ⅔, but typically each fraction is ½, since this is most efficient fraction to use.

Preferably, the beacon receiver is periodically tested with an internal beacon of known power and its associated transmitter is prevented from transmitting if a beacon receiver fault occurs.

Alternatively, beacon and system communications are separated in time.

This requires timing control, for example, provided by putting satellite timing receivers in all transmit and receive terminals.

Preferably, beacon reception and transmission happen at the same equipment, separated in time, by arranging for reception to take place whenever transmission is not according to schedules of the random TDMA protocol.

This allows equipment that is sharing the spectrum with a beacon generating system to also transmit its own beacons for the benefit of any potential third sharing system.

In accordance with a second aspect of the present invention, a communication system comprises at least one transmitter belonging to one communication system and at least one receiver belonging to another communication system, wherein a beacon transmitter is associated with the at least one receiver and a beacon receiver is associated with the at least one transmitter, whereby a power spectral density limit for transmission at any one transmitter is determined based upon the strength of the or each beacon received at the associated beacon receiver.

In accordance with a third aspect of the present invention, a transmitter for a communication system, the transmitter being provided with an associated beacon receiver, whereby a power spectral density limit for transmission from the transmitter is determined based on the strength of one or more beacons received at the associated beacon receiver.

In accordance with a fourth aspect of the present invention, a receiver for a communication system, the receiver being provided with an associated beacon transmitter, whereby a beacon can be transmitted by the beacon transmitter to control interference, such that a desired maximum power spectral density of interference received at the receiver is achieved.

Figure 2:
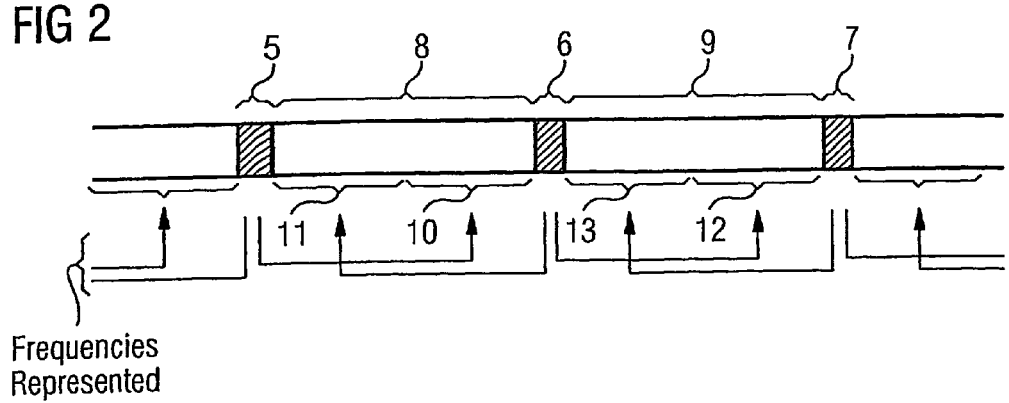

An example of a method of controlling interference from a transmitter to a receiver in a communication system will now be described with reference to the accompanying drawings in which:

FIG. 1 illustrates use of beacons in a method according to the present invention; and, FIG. 2 illustrates a frequency band structure for the beacons and managed bands using the method of the present invention.

FIG. 1 illustrates one example where the method of the present invention may be applied. A first receiver 1 which is trying to receive from a first transmitter (not shown) needs to prevent interference 2 on the frequency that it is trying to receive. To do this it transmits a beacon 3 representing that frequency. This beacon is received at a beacon receiver associated with a second transmitter 4 which is trying to transmit to a second receiver (not shown). If the second transmitter 4 transmits it will produce interference 2 at the first receiver 1.

The beacon 2 transmitted from the first receiver represents the frequency at which the receiver 1 is trying to receive. Clearly this cannot be the same frequency as that being received, so a nearby frequency is assigned for this purpose. A compromise is required, so that the frequency used is near enough to have good correlation of path loss, but far enough away to allow diplexing.

Although FIG. 1 only shows one receiver and one transmitter, in a practical system there are multiple receivers and transmitters. The basic principle is that some or all of the receivers 1 transmit a beacon 3 at a suitable power level. Any terminal with a transmitter 4 that can hear a beacon related to a given frequency must reduce its transmitter power according to the strength of the beacon. If the permissible power is too low to allow the required communications then the terminal cannot use that frequency. A terminal operating dynamic channel allocation (DCA) would scan around the beacons and select the frequency whose beacon was received at the lowest power. If multiple beacons representing the same frequency are received at different powers the power of interest is taken to be the strongest.

The beacon transmission band is arranged as a band of frequencies at either end (or both ends) of the band being managed. There is one separate beacon signal relating to each frequency in the band and these must be multiplexed together. Determination of beacon power and interference limitation is explained below for the situation illustrated in FIG. 1. In the two links, primary status has been allocated to a terminal trying to receive and secondary status to the one trying to transmit and for simplicity the transmitter for the primary link and the receiver for the secondary link are not shown. The primary receiver 1 is transmitting its beacon 3 in order to guarantee reception.

The following assumptions are made:

$P_P$ is the primary receiver beacon power $P_S$ is the secondary transmitter power spectral density g is the path gain between the two equipment connectors—this includes propagation path gain ($\ll 1$), antenna gains and feeder losses $N_P$ is the primary receiver noise figure $N_S$ is the noise figure of the beacon receiver at the secondary transmitter $B_S$ is the effective bandwidth at the beacon receiver for receiving the beacon $\gamma_S$ is the minimum signal to noise ratio for receiving the beacon in its effective bandwidth d is the factor by which we allow the primary receiver to be de-sensitised The level of $P_S$ needs to be set such that it is measurable at a point where a secondary transmitter could produce non-trivial interference at the primary receiver. This is done by fixing the maximum power that a secondary transmitter can emit when the beacon is undetectable, such that only acceptable interference arises.

The limit sensitivity for the beacon receiver is $L_S = kTB_S N_S \gamma_S$ (where k is Boltzmann's constant and T is the operating temperature in degrees Kelvin).

Thus, if the received beacon power is less than or equal to $L_S$, then the secondary transmitter will emit a power spectral density of $P_{S-MAX}$ Watts/Hz. This is set so that if the beacon signal is equal to $L_S$, then only acceptable interference will be generated at the primary receiver. Assuming that this condition happens for a path gain of g, then the received beacon power will be given by $$L_S = P_P \cdot g. \text{ Thus } P_P \cdot g = kTB_S N_S \gamma_S.$$

The interference power spectral density generated at the primary receiver will then be $P_{S-MAX} \cdot g$. The acceptable level for this will be $kTN_P(d-1)$. Thus $P_{S-MAX} \cdot g = kTN_P(d-1)$. Eliminating g from the two equations gives $$P_{S-MAX} = P_P(d-1)\frac{N_P}{\gamma_S B_S N_S}$$

This assumes that the operating temperature is the same at both locations which will usually be true to a reasonable approximation.

In practice, for universal operation, a reference needs to be set. For example, if the reference is set at 1 W for a de-sensitisation of 3 dB with a 0 dB noise figure primary receiver, then conveniently this gives a beacon power for 3 dB de-sensitisation equal to $1/N_P$ Watts.

In the following example, the permitted de-sensitisation is 3 dB, both receivers have a noise figure of 6 dB, $B_S = 1$ kHz and $\gamma_I = 10$ dB. Thus, the beacon power is ¼ Watt and so $P_{S-MAX} = 2.5 \times 10^{-5}$ W/Hz.

In this example, a secondary transmitter with a bandwidth, for example, of 100 KHz is allowed to transmit up to 2.5 W if it cannot hear a beacon. As the beacon is detected and its received power climbs above $L_S$, then the maximum allowable power has to be reduced pro-rata.

From this simple analysis it can be seen that the appropriate beacon power is independent of primary system bandwidth, operating range, range to the secondary transmitter(s) and the primary system required signal to noise ratio. The beacon power depends only on the primary receiver noise figure and the allowable de-sensitisation. Once a reference for beacon power has been legislated, only relatively small variations will result. The reference power, assuming receiver noise temperatures no lower than 290° K and desensitisation by no less than 3 dB, will be the maximum beacon power ever used.

Feeder loss and antenna patterns do not affect the beacon power or maximum secondary power conditions for the beacon system, although they do affect the spectrum sharing that is available. The maximum power a secondary transmitter may transmit depends on the sensitivity of its beacon receiver. Thus the equipment manufacturer is motivated to produce beacon receivers with low noise figure and good beacon detectability.

FIG. 2 illustrates an arrangement of a beacon band structure for the method of the present invention. A beacon signal represents the reception of a particular frequency in a band. At least one beacon type is required for every frequency. It is necessary to determine how large a beacon managed band 8, 9 ought to be, how much spectrum should be allocated to beacon transmission and how many frequencies should be allocated within a beacon managed band. As in all tradeoffs the result is a compromise. On the one hand, it is desirable that the beacon managed band is as large as possible to reduce the relative overhead of the beacon channel, but on the other hand it should be as narrow as possible in order to guarantee the same radio propagation characteristics across the band and, in particular, between any sub-band and the beacon transmission band.

As it is not practical to reduce the managed bandwidth down to the multipath fading correlation bandwidth of the channel, then the beacon transmission band must be wide enough to have reasonable inherent multipath diversity. If this beacon reception diversity is greater than that available to the users of the band, then the interference sensing mechanism will be conservative, i.e. it will tend to overestimate the interference generated. In the alternative situation, an underestimate may occur, so it may be necessary to introduce a fading margin to account for this difference. This can be done by transmitting the beacon at slightly higher power.

Based on the above requirement, it is desirable that the beacon managed band is no greater than about 5% of its centre frequency, which gives reasonable correlation of average propagation characteristics. Some care is needed to ensure that no tight frequency selectivities in the antennas cause difficulties. Such a problem is more likely to arise in the primary service, which will probably be incumbent, than in the secondary service, since the secondary service is generally designed to use any of the frequencies in the beacon managed band. One solution to the problem for the primary service is to bias the beacon transmitted power according to the relative antenna gains in the beacon transmission band and the represented signal frequency. Another feature is that the beacon transmission band is preferably set so that it does not exceed about 5% of the beacon managed band in order to avoid there being an unacceptable overhead for the beacons.

Consideration must be given to the provision of duplexing filters since the primary receiver must transmit and the secondary transmitter must receive. Clearly if the beacon must be transmitted to represent a frequency that is right next to the beacon transmission band there will be a problem. This difficulty can be solved by having beacon transmission bands 5, 6, 7 at each end of the beacon managed band 8, 9. The frequencies available for use are then represented by the beacon transmission band which is further away i.e. a first range 10 of frequencies in the managed band 8, are managed by the transmission band 5, whereas a second range of frequencies 11 are managed by band 6. At first this might seem to double the overhead. However, this is overcome by having the beacon transmission bands manage bands on either side, hence band 6 also manages frequency range 12 of beacon managed band 9 whilst band 7 manages frequency range 13. The size of the first and second range 10, 11 is generally equal, i.e. half of each managed band is managed by one beacon transmission band 5 and half by the other 6, but these ranges can be different proportions of the total beacon managed band 8, such as ⅓ and ⅔ or other ratios.

In a specific example, a frequency band is set around 2 GHz, with a bandwidth 8 of 100 MHz. This leads to a beacon transmission band 6 of 5 MHz (based on 5% bandwidth). According to the structure of FIG. 2, there is always a frequency spacing of at least 50 MHz to allow for duplexer filtering.

The choice of number of frequencies represented is again, a trade-off between complexity and flexibility. From the viewpoint of simplicity we would choose to have as few as possible. For example, if our 100 MHz wide band had an incumbent system with 5 MHz channels then the obvious answer would appear to be to have twenty, 5 MHz channels. However, this pre-supposes that there will be only one further tier of spectrum sharing and that the sharing system will also have a bandwidth of 5 MHz or multiples thereof. It may be that some sharing systems are introduced based on 7 MHz. In this case they may need to transmit as many as 3 beacons to keep a channel free. This would reserve 15 MHz of spectrum which would be inefficient. From the viewpoint of flexibility the answer would be to use the highest common divisor of all anticipated channel spacings. The disadvantage of this approach is that it might lead to the need for a large number of beacons for each frequency used. For example, a spacing of 1 MHz would require 5 beacons to keep a 5 MHz channel free. The number of frequencies would thus be a compromise between wasted spectrum and having a large number of beacons. At this stage a bandwidth of 5 MHz nevertheless seems reasonable leading to 20 beacons in this example.

At any given beacon receiver there may be beacons from a number of receivers, relating to some different and some common frequencies. A would-be transmitter wants to examine beacons for a particular frequency. If there are many beacons for that frequency it is desirable that the task should not grow unduly. The options for multiple access are division in frequency, time and code (FDMA, TDMA and CDMA respectively).

If beacon transmitters and receivers are to be low cost, then implicitly they have relatively inaccurate frequency references. For example, a 20 ppm end to end error would not be unreasonable, but at 2 GHz this would correspond to an error of 40 kHz making any FDMA system difficult to operate. Additionally, each carrier would be relatively narrowband for FDMA. For example, representing 20 frequencies in 5 MHz gives a maximum channel spacing of 250 kHz and so the multipath diversity inherent in a bandwidth of 5 MHz is not exploited.

It is desirable for there to be no need for co-ordination between the different beacon transmitters, so no framing structures can be imposed, as required in TDMA. GPS receivers could be used to achieve this, but these can also have problems, particularly given the need for indoor operation and without some sort of timing control, the only available form of multiplexing in the time domain is random transmission, akin to the Aloha protocol. However, a problem with this is that a priori it is not possible to be sure how many beacons need to be received in a given area, so it is difficult to dimension the average duty cycle of the transmission.

CDMA allows for a very large number of beacons relating to the same frequency since they would have the same code and would be separated only in time, but this suffers from the near far problem. If a strong beacon relating to one frequency is received then the receiver may know that that frequency is unavailable. However, it cannot know whether other frequencies are available since the beacon receiver is de-sensitised and it must be assumed that other beacons may be present.

Overall, a combination of random TDMA and CDMA is preferred. The CDMA element provides the ability to measure multiple beacons relating to the same frequency and the TDMA element provides resistance to the near far effect. By listening for long enough, a beacon receiver can accumulate adequate confidence that, if there had been a beacon for a particular receiver at a lower level than a strong signal then it would have had an opportunity to receive it. Where a beacon transmitter needs to send multiple signals from one location (e.g. for a frequency that requires several contiguous sub bands) they must all be transmitted simultaneously and not in sequence. This is to avoid a single source occupying too much of the time.

It is desirable that the beacon receiver is made as sensitive as possible, which can be done by making the correlation period for the CDMA component as long as practically possible. The problem here is that correlating for a long period is subject to the effects of the frequency error between the beacon transmitter and the receiver. For example, at 2 GHz there could be an end-to-end error of 40 kHz. The longest period over which it is usually possible to correlate is one half cycle of the error frequency, in this case 12.5 µs. This leads to an effective bandwidth of 80 kHz which is too wide for sensitive reception. This can be radically improved by the use of an FFT correlator, for example as described in D J R Van Nee & A J R M Coenen, "New Fast GPS Code-Acquisition Technique Using FFT", IEE Electronic Letters, 17 Jan. 1991 Vol 27, pp 158-160. By choosing the number of FFT bins, a correlation period of any length can be made. The maximum useful correlation period depends on the correlation time of the channel. This varies from about 200 µs to 1 ms depending on the mobility of the transmitter, receiver or both. The underlying code can be set to have a duration of around 200 µs with up to, for example, 4 repetitions allowed which can be used in a static receiver to improve sensitivity. This gives an effective bandwidth from 5 kHz down to 1.25 kHz allowing good sensitivity. The preferred FFT size is 16, 32 or 64, all practical with today's technology for a 10 MHz sampling rate, although with changes in technology other sizes may be appropriate. There is some scalloping loss from the FFT, but this can be improved by randomising the frequency over ±0.5 bins.

A further issue for the beacon information is that although it appears that it is only necessary to know the frequency represented by the beacon, it is also necessary to distinguish beacons transmitted from receivers in the same system as the transmitter, otherwise the transmitter never gets an opportunity to transmit. At any given time there are only a relatively small number of systems sharing any given band. Thus, only a small number of codes are needed to distinguish the different systems will be needed. Eight bits would normally be sufficient. Every beacon transmitter appends its system type identifier to each beacon and transmits this using the applicable spread spectrum code. This part is not related to the represented frequency, but is married to it by its fine frequency, i.e. the FFT bin selected and its timing. Terminals for a given system only need to correlate codes for their own system, so a single matched filter can be used here. Thus, there is no loss in sensitivity in determining whether a beacon came from a beacon receiver's own type of system. In this case, the beacon receiver ignores this particular signal when determining the power at which it could operate.

As stated earlier, for a given represented frequency the preferred power to use for the beacon is the largest of the received powers. However, in multipath, there may be several paths all relating to the same beacon transmission. Inevitably there will be some ambiguity in determining this situation, but this can be resolved in most cases by only taking other multipath components from the same FFT bin output as that which identified the strongest output, which means that in the absence of significant Doppler the multipath components from any given beacon transmitter all fall on the same fine frequency. In addition, only multipath components are taken from a narrow window around the largest peak, which constrains the components taken to within the maximum delay span of the propagation medium. Finally, a maximum number of paths are taken to avoid including peaks of noise.

The description above sets out the situation for a primary and a secondary system in which the receivers of the primary system have beacon transmitters and the transmitters of the secondary system have beacon receivers, but this case gives no protection for the secondary system. A more general set of possibilities is shown in Table 1.

TABLE 1

| Type of System | Beacon Transmitter | Beacon Receiver |
| --- | --- | --- |
| 1. Primary (Dominant) | x | |
| 2. co-operating | x | x |
| 3. Tertiary (Unprotected) | | x |

In addition, beacon transmissions could be made responsive for systems that could tolerate brief loss of communications. In this case a receiver would only transmit a beacon when it encountered unacceptable interference. The interfering sources would then detect the beacon and either stop transmitting or reduce their power. It might in some cases be desirable for type 2 systems to receive and transmit essentially simultaneously on the beacon channel. This would apply if the dynamics of spectrum sharing were such that it was not appropriate for the terminal to stop transmitting the beacon when it was making its own system transmissions. The random TDMA transmission format for the beacon would allow this to happen. The choice of level of protection for a system would be a matter for a combination of common sense and legislation.

There is potentially a great deal more flexibility in the actual beacon power a device may transmit. This may be influenced by a number of factors such as the manufacturer needing or wanting to increase the nominal transmitted beacon power to take account of inaccuracies in RF gains, beacon transmitters etc. Regulation would seek to prevent manufacturers degrading their equipment performance requirements excessively at the expense of spectral efficiency and for this reason there may be a case for regulating an absolute maximum beacon transmitted power for a certain class of receiver. Further, it may be desirable, and in some cases, acceptable to increase the beacon transmitted power to take account of multipath fading that sometimes reduces the received beacon power without affecting the interference path.

There are several fundamental approaches that can be applied to the setting of the beacon power. A fixed beacon power can be transmitted, based on the equipment design. This approach is robust, but not very flexible and does not always lead to the best protection for the receiving equipment against multiple interferers. Another option is to arrange for the primary receiver to estimate the received noise and set the beacon power accordingly. In this case, as more interferers share the frequency the interference rises. This rise reduces the margin for further increase in interference leading to an increase in the beacon power. This increase forces the interferers to reduce their power, or prevents additional interferers from operating, in order to maintain the receiver sensitivity. Alternatively, the primary receiver is arranged to set its beacon power according to the maximum acceptable level of interference given the signal that it is receiving. This approach clearly should not be used in conjunction with power control within the system, as the two systems will interact in complex and potentially undesirable or unpredictable ways. However, for fixed power systems this approach can be used to maximise spectrum sharing.

The fundamental beacon concept is flexible enough to allow any or all of the above approaches to apply for different systems operating in the same beacon managed band. In any given band, care needs to be taken in considering the types of system sharing the spectrum to ensure that overall stability is preserved. It would be possible, for example, to operate one of each of the types of system in Table 1 without instability. The type 1 system does not respond to beacons; the type 2 system defers to the type 1 system and protects itself from the type 3 system and the type 3 system defers to the types 1 and 2 systems and uses whatever spectrum it can find. For broadcast systems there are further degrees of freedom. For example, if one wished to use the beacon concept to allow sharing with the television band then every receiver needs to be equipped with a beacon transmitter, however, a beacon only needs to be transmitted corresponding to the channel that the viewer is receiving at the time.

The strong desirability for transmitting the beacon through the same antenna as that used for reception, in order to share the antenna's properties, precludes the use of simple masthead pre-amplifiers. Instead, either a masthead pre-amplifier is arranged to be the source of the beacon transmission, with the reference power chosen in such a way that the absolute power requirement is always modest; or else a diplexer is built into the masthead pre-amplifier with gain for the beacon transmitter as well. Although these requirements add complexity, they do not create insuperable problems and additional revenue from the freed up spectrum should more than cover such costs.

The whole concept of spectrum sharing through beacons depends on the beacons being received whenever present with power above the presumed reference sensitivity. Equipment with a failed beacon receiver may transmit at maximum power on any frequency and cause arbitrary interference, so the status of the beacon receivers must be known at all times. To deal with this a built in self-test for the beacon receivers can be provided, in which a known beacon is injected periodically into the receiver at limit range level in order to test its function. Failure to receive the test beacon results in the equipment being prevented from transmitting.

The invention claimed is:

1. A method of controlling interference from a transmitter in one communication system to a receiver in another communication system, the method comprising:
    transmitting a beacon, in a beacon transmission band, from a beacon transmitter associated with the receiver, the beacon being representative of a frequency within a beacon managed band at which the receiver is trying to receive, and the beacon transmission band being separated from the beacon managed band by using a different frequency;
    listening for the beacon at a beacon receiver associated with the transmitter; and
    deriving a power spectral density limit for a transmission from the transmitter, based upon the strength of the beacon received at the beacon receiver.

2. The method according to claim 1, wherein, for a plurality of beacons received representing the same frequency, the derived transmit power spectral density limit is related to that of the beacon received at the highest power.

3. The method according to claim 1, further comprising:
    comparing the transmit power spectral density limit with a predetermined minimum transmit power spectral density required by the transmitter for that frequency; and transmitting a signal at that frequency, only if the determined transmit power spectral density limit exceeds the minimum.

4. The method according to claim 1, wherein a predetermined maximum transmit power spectral density is set if no beacons are received at the transmitter.

5. The method according to claim 1, further comprising choosing a transmission frequency for the transmitter which permits the maximum power spectral density for the transmission.

6. The method according to claim 5, wherein a transmit power spectral density for a transmission from the transmitter is set dependent upon the strength of the received beacon at the chosen frequency.

7. The method according to claim 1, wherein:
the transmission from the transmitter is transmitted at a frequency derived by determining the strongest received beacon which represents any one frequency; and
thereafter selecting, from the determined strongest beacons, the beacon with the lowest power; and
transmitting at the frequency represented by that selected beacon.

8. The method according to claim 1, wherein the maximum permitted power spectral density of the transmitter is set at the product of the receiver beacon power; and a factor by which the receiver can be de-sensitized minus one; and the resultant of the receiver noise figure divided by the product of the effective bandwidth at the beacon receiver for receiving the beacon, the minimum signal to noise ratio for receiving the beacon in its effective bandwidth and the noise figure of the beacon receiver at the transmitter.

9. The method according to claim 1, wherein a random time division multiple access (TDMA) protocol is applied, whereby beacons representing different frequencies transmit at different times, such that over a series of cycles a beacon representing each frequency will be heard at a different time relative to another particular represented frequency, such that no one frequency at a higher power consistently blocks reception of a beacon representing another frequency at a lower power.

10. The method according to claim 9, wherein beacon reception and transmission happen at the same equipment, separated in time, by arranging for reception to take place whenever transmission is not required according to schedules of the random TDMA protocol.

11. The method according to claim 1, wherein a code division multiple access (CDMA) protocol is applied, whereby beacons representing different frequencies are distinguished from one another by different codes.

12. The method according to claim 11, wherein a correlation period of a CDMA component of the beacon signal is controlled by a fast Fourier transform (FFT) controller.

13. The method according to claim 1, wherein each beacon transmits a type identifier and each beacon receiver comprises type specific correlation means, such that a beacon receiver can ignore same type beacons in determining whether or not or how much power to transmit.

14. The method according to claim 1, wherein a receiver transmits a beacon only if interference levels exceed an acceptable value.

15. The method according to claim 1, wherein the beacon power is adapted to the wanted signal power received at the receiver.

16. The method according to claim 1, wherein the beacon power is adapted to the interference power received at the receiver.

17. The method according to claim 1, wherein a bandwidth managed by a beacon is sufficiently narrow that substantial correlation of shadow fading applies across that bandwidth.

18. The method according to claim 1, wherein each beacon occupies a frequency bandwidth which is small compared with the total bandwidth managed by that beacon.

19. The method according to claim 18, wherein neighboring beacons in a managed bandwidth manage discrete contiguous sections of frequency, each section comprising a fraction of the beacon managed band, each beacon being separated from the frequency bandwidth which it manages by the alternate fraction.

20. The method according to claim 19, wherein each fraction is ½.

21. The method according to claim 1, wherein the beacon receiver is periodically tested with an internal beacon of known power and its associated transmitter is prevented from transmitting if a beacon receiver fault occurs.

22. The method according to claim 1, wherein:
the beacon transmission band is arranged as a band of frequencies at least one end of the beacon managed band;
there is one separate beacon signal relating to each frequency in the beacon managed band; and
said beacon signals are multiplexed together.

* * * * *